US011606132B2

United States Patent
Kela et al.

(10) Patent No.: US 11,606,132 B2
(45) Date of Patent: Mar. 14, 2023

(54) CLIENT DEVICE, NETWORK ACCESS NODE AND METHODS FOR BEAM MANAGEMENT IN POWER SAVING STATE

(71) Applicant: Huawei Technologies Co., Ltd., Shenzhen (CN)

(72) Inventors: Petteri Kela, Kista (SE); Mario Costa, Helsinki (FI); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/160,088

(22) Filed: Jan. 27, 2021

(65) Prior Publication Data

US 2021/0152232 A1 May 20, 2021

Related U.S. Application Data

(63) Continuation of application No. PCT/EP2018/070429, filed on Jul. 27, 2018.

(51) Int. Cl.
*H04B 7/06* (2006.01)
*H04W 76/19* (2018.01)
(Continued)

(52) U.S. Cl.
CPC ...... *H04B 7/0695* (2013.01); *H04W 52/0225* (2013.01); *H04W 74/0833* (2013.01); *H04W 76/11* (2018.02); *H04W 76/19* (2018.02)

(58) Field of Classification Search
CPC .......... H04B 7/0695; H04B 7/08; H04B 7/06; H04W 52/0225; H04W 74/0833;
(Continued)

(56) References Cited

U.S. PATENT DOCUMENTS

2017/0251518 A1\* 8/2017 Agiwal ................. H04W 76/28
2018/0063883 A1   3/2018 Nagaraja et al.
(Continued)

FOREIGN PATENT DOCUMENTS

CN   103491644 A   1/2014
CN   107889244 A   4/2018
(Continued)

OTHER PUBLICATIONS

"3rd Generation Partnership Project; Technical Specification Group Radio Access Network; NR; NR and NG-RAN Overall Description; Stage 2 (Release 15)," 3GPP TS 38.300 V15.2.0, pp. 1-87, 3rd Generation Partnership Project, Valbonne, France (Jun. 2018).
(Continued)

*Primary Examiner* — Thai Nguyen
(74) *Attorney, Agent, or Firm* — Leydig, Voit & Mayer, Ltd.

(57) ABSTRACT

The application relates to beam management for a client device in a power saving state. When the client device is in the power saving state, the client device monitors serving beams of a network access node based on a serving beam configuration. The serving beam configuration indicated the serving beams to be monitored by the client device in the power saving state. If the client device detects a beam failure during the serving beam monitoring in the power saving state, the client device performs a beam reconfiguration procedure. The beam reconfiguration procedure informs the network access node about the change in serving beam status and allows the network access node to update the serving beam configuration.

14 Claims, 5 Drawing Sheets

(51) Int. Cl.
*H04W 76/11* (2018.01)
*H04W 52/02* (2009.01)
*H04W 74/08* (2009.01)

(58) Field of Classification Search
CPC . H04W 76/11; H04W 76/19; H04W 52/0216; H04W 52/0229; Y02D 30/70
See application file for complete search history.

(56) References Cited

U.S. PATENT DOCUMENTS

| | | | |
|---|---|---|---|
| 2018/0234890 A1* | 8/2018 | Shih | H04W 60/00 |
| 2019/0215896 A1* | 7/2019 | Zhou | H04B 7/0695 |
| 2019/0350002 A1* | 11/2019 | Chen | H04W 72/14 |
| 2020/0036430 A1* | 1/2020 | Kim | H04L 25/0204 |

FOREIGN PATENT DOCUMENTS

| | | | |
|---|---|---|---|
| CN | 107889274 A | 4/2018 | |
| WO | 2018128426 A1 | 7/2018 | |
| WO | WO-2019041244 A1 * | 3/2019 | H04B 7/0695 |

OTHER PUBLICATIONS

"Beam management in C-DRX," 3GPP TSG-RAN WG1 #89, Hangzhou, China, R1-1708681, pp. 1-2, 3rd Generation Partnership Project, Valbonne, France (May 15-19, 2017).

* cited by examiner

CLIENT DEVICE, NETWORK ACCESS NODE AND METHODS FOR BEAM MANAGEMENT IN POWER SAVING STATE

CROSS-REFERENCE TO RELATED APPLICATIONS

This application is a continuation of International Application No. PCT/EP2018/070429, filed on Jul. 27, 2018, the disclosure of which is hereby incorporated by reference in its entirety.

TECHNICAL FIELD

The application relates to a client device and a network access node for beam management in power saving state. Furthermore, the application also relates to corresponding methods and a computer program.

BACKGROUND

In 5G new radio (5G-NR) there are three radio resource control (RRC) states for a user equipment (UE). The RRC states defined in 5G-NR are RRC_IDLE, RRC_INACTIVE and RRC_CONNECTED. In each of these RRC states discontinuous reception (DRX) can be utilized to decrease the energy consumption of the UE. When the UE is in RRC_IDLE state or RRC_INACTIVE state, DRX allows the UE to go into a sleep state between paging occasions. When the UE is in RRC_CONNECTED state, the network can parameterise the UE to allow DRX to be used between data transmissions.

In long term evolution (LTE), wake-up signalling is currently being standardized. Hence, it is highly likely that wake-up signalling will be adopted in 5G-NR standards as well. Wake-up signalling can be used by the network to instruct a UE in a sleep state to continue to sleep or to wake-up to receive upcoming control information and data transmission.

SUMMARY

The present application provides solutions which mitigate or solve the drawbacks and problems of conventional solutions.

According to a first aspect of the application, a client device for a wireless communication system is provided, the client device being configured to obtain a serving beam configuration when being in a connected state, wherein the serving beam configuration indicates one or more serving beams to be monitored by the client device when being in a power saving state;

monitor the one or more serving beams of a network access node according to the serving beam configuration when being in the power saving state;

perform a beam reconfiguration procedure upon detecting a beam failure for the one or more monitored serving beams when being in the power saving state.

A serving beam configuration can in this disclosure be understood to mean a configuration defining the serving beams to be used by the network access node to serve the client device.

That the client device is in connected state can, in this disclosure, be understood to mean that the client device has an established connection with a network access node. That the client device is in the power saving state can, in this disclosure, be understood to mean that the client device does not have an established connection with a network access node or that its connection has been suspended. In the power saving state the client device may have turned one or more of its transceivers partially or fully off. The power saving state can be a so-called sleep state.

An advantage of the client device according to the first aspect is that the network can reach the client with low latency, and at the same time the client device saves energy e.g. compared to when being in a connected state.

In an implementation form of a client device according to the first aspect, the client device is further configured to monitor for a paging messages in the one or more serving beams when being in the power saving state.

An advantage with this implementation form is that the network increases the capacity of paging messages, and the client is reachable with low latency while saving energy. The capacity can be considered as the radio resources used for paging.

In an implementation form of a client device according to the first aspect, the client device is further configured to select a candidate beam upon detecting the beam failure for the one or more monitored serving beams;

transmit a random access preamble associated with the selected candidate beam to the network access node.

An advantage with this implementation form is that the network can maintain reachability to the client device.

In an implementation form of a client device according to the first aspect, the client device is further configured to transmit an inactive radio network temporary identifier (I-RNTI), of the client device to the network access node upon transmitting the random access preamble.

An advantage with this implementation form is that the network can associate the serving beam to the client device corresponding to the I-RNTI.

In an implementation form of a client device according to the first aspect, the client device is further configured to receive a response message from the network access node in response to the transmission of the I-RNTI of the client device when the client device is in the power saving state, wherein the response message is addressed to the I-RNTI of the client device.

An advantage with this implementation form is that the client device is acknowledged of the updated serving beams.

In an implementation form of a client device according to the first aspect, the client device is further configured to transmit a connection resume request to the network access node upon reception of a random access response from the network access node, wherein the connection resume request further indicates a serving beam configuration update request for the power saving state when the selected candidate beam is within a current radio access network notification area, RNA, of the client device.

An advantage with this implementation form is that the network can maintain reachability to the client device while the latter is in a power saving state.

In an implementation form of a client device according to the first aspect, the client device is further configured to receive an updated serving beam configuration from the network access node in response to the transmission of the connection resume request, wherein the updated serving beam configuration indicates one or more updated serving beams to be monitored by the client device when being in a power saving state;

monitor the one or more updated serving beams according to the updated serving beam configuration when being in the power saving state.

An advantage with this implementation form is that the client device can save energy by only monitoring the serving beams. Furthermore, an updating mechanism is provided so to solve a beam failure detected by the client device.

In an implementation form of a client device according to the first aspect, the connection resume request further indicates a RNA update request when the selected candidate beam is outside the current RNA of the client device.

An advantage with this implementation form is that the network can maintain reachability to the client while the latter is in the power saving state.

In an implementation form of a client device according to the first aspect, the power saving state is an inactivity state, and the client device is further configured to enter an idle state when no candidate beam has been selected upon detecting a beam failure for the one or more monitored serving beams and when an inactivity timer associated with the one or more monitored serving beams has expired.

An advantage with this implementation form is that the client can save energy even further by entering the idle state.

In an implementation form of a client device according to the first aspect, the client device is further configured to determine a quality of each serving beam based on measurements of reference signals associated with each serving beam, wherein the reference signals are SSBs or CSI-RSs;

detect the beam failure for the one or more monitored serving beams when the determined quality of each serving beam is below a quality threshold value.

This implementation form provides a solution for detecting beam failure.

In an implementation form of a client device according to the first aspect, the client device is further configured to obtain a wake-up signalling configuration when being in the connected stated, wherein the wake-up signalling configuration indicates wake-up signals to be monitored by the client device on the one or more serving beams when being in the power saving state;

monitor wake-up signals in the one or more serving beams according to the wake-up signalling configuration when being in the power saving state.

An advantage with this implementation form is that the client device can save energy by focusing on monitoring the wake-up signals.

In an implementation form of a client device according to the first aspect, the client device is further configured to receive the wake-up signalling configuration from the network access node.

An advantage with this implementation form is that the client device after having received the wake-up signalling configuration knows how to monitor wake-up signals as defined in the wake-up signalling configuration.

In an implementation form of a client device according to the first aspect, the client device is further configured to receive the serving beam configuration from the network access node.

This implementation form provides a convenient signalling scheme.

According to a second aspect of the application, the above mentioned and other objectives are achieved with a network access node for a wireless communication system, the network access node being configured to obtain a serving beam configuration for a client device, wherein the serving beam configuration indicates one or more serving beams to be monitored by the client device when the client device is in a power saving state;

transmit a reference signal in each one of the one or more serving beams to the client device when the client device is in the power saving state.

An advantage of the network access node is that the network can reach the client with low latency, and at the same time the client device can save energy.

In an implementation form of a network access node according to the second aspect, the network access node is further configured to transmit a paging message to the client device in the one or more serving beams when the client device is in the power saving state.

An advantage with this implementation form is that the network can increase the capacity of the paging messages.

In an implementation form of a network access node according to the second aspect, the network access node is further configured to receive a random access preamble associated with a candidate beam from the client device when the client device is in the power saving state;

transmit a random access response to the client device in response to the reception of the random access preamble.

An advantage with this implementation form is that the network can maintain reachability to the client device while the latter is in power saving state.

In an implementation form of a network access node according to the second aspect, the network access node is further configured to receive an I-RNTI of the client device from the client device upon reception of the random access preamble from the client device;

identify the client device based on the I-RNTI of the client device;

transmit a response message to the client device when the client device is in the power saving state, wherein the response message is addressed to the I-RNTI of the client device.

An advantage with this implementation form is that the network access node acknowledges the update of the serving beams.

In an implementation form of a network access node according to the second aspect, the network access node is further configured to receive a connection resume request from the client device, wherein the connection resume request further indicates a serving beam update request for the power saving state when the candidate beam is within a current RNA of the client device;

update the serving beam configuration for a client device;

transmit the updated serving beam configuration to the client device.

An advantage with this implementation form is that the network access node can maintain reachability to the client device while allowing the client device to save energy by focusing on monitoring the serving beams.

In an implementation form of a network access node according to the second aspect, the network access node is further configured to transmit wake-up signals in the one or more serving beams to the client device when the client device is in the power saving state.

An advantage with this implementation form is that the network access node can increase the capacity of wake-up signals while allowing the client device to save energy by focusing on its monitoring.

In an implementation form of a network access node according to the second aspect, the network access node is further configured to determine a wake-up signalling configuration for the client device when the client device is in the power saving state;

transmit the wake-up signalling configuration to the client device.

An advantage with this implementation form is that the client device after having received the wake-up signalling configuration from the network access node knows how to monitor wake-up signals as defined in the wake-up signalling configuration.

In an implementation form of a network access node according to the second aspect, the network access node is further configured to determine the serving beam configuration for the client device;

transmit the serving beam configuration to the client device.

According to a third aspect of the application, the above mentioned and other objectives are achieved with a method for a client device, the method comprises obtaining a serving beam configuration when being in a connected state, wherein the serving beam configuration indicates one or more serving beams to be monitored by the client device when being in a power saving state;

monitoring the one or more serving beams of a network access node according to the serving beam configuration when being in the power saving state;

performing a beam reconfiguration procedure upon detecting a beam failure for the one or more monitored serving beams when being in the power saving state.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the application, the above mentioned and other objectives are achieved with a method for a network access node, the method comprises obtaining a serving beam configuration for a client device, wherein the serving beam configuration indicates one or more serving beams to be monitored by the client device when the client device is in a power saving state;

transmitting a reference signal in each one of the one or more serving beams to the client device when the client device is in the power saving state.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

The application also relates to a computer program, characterized in program code, which when run by at least one processor causes said at least one processor to execute any method according to embodiments of the application.

Further, the application also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the application will be apparent from the following detailed description.

BRIEF DESCRIPTION OF THE DRAWINGS

The appended drawings are intended to clarify and explain different embodiments of the application, in which.

DETAILED DESCRIPTION

Beam management is a distinguishing feature of 5G-NR. In LTE, which does not consider beam management, wake-up signalling for waking up UEs in RRC_IDLE state is being standardized. The aim is to have a wake-up signal indicating whether a UE is required to wake-up for upcoming paging occasion or not. Also wake-up signal for connected state DRX has been discussed.

In 5G-NR beam management is based on synchronization signal blocks (SSBs) and channel state information reference signals (CSI-RSs). Hence, in addition to cell level mobility also beam level mobility is considered in RRC_CONNECTED state. However, in RRC_IDLE state or RRC_INACTIVE state beam level mobility is not considered. In multi-beam operation, paging can be sent with multiple beams to increase the chance of reaching the UE. In this case, each beam has its own synchronization signal (SS) and physical broadcast channel (PBCH) block. These SS/PBCH blocks are transmitted in bursts by the network. The periodicity of the bursts can be configured and can be between 5 and 160 ms. By receiving and measuring such bursts, the UE can determine the serving beam(s).

To improve energy efficiency, wake-up signalling may be introduced for 5G-NR. Moreover, the inventors have identified that it could be beneficial to considered beam level mobility in at least RRC_INACTIVE state in addition to RRC_CONNECTED state. This could improve wake-up signalling reachability and radio resource efficiency.

Hence, embodiments of the application provide ways to manage beams for UEs in power saving state, such as RRC_INACTIVE state or RRC_IDLE state. Thereby, energy efficiency can be improved, while still maintain wake-up signalling and paging reachability for UEs in power saving state.

Figure 1:
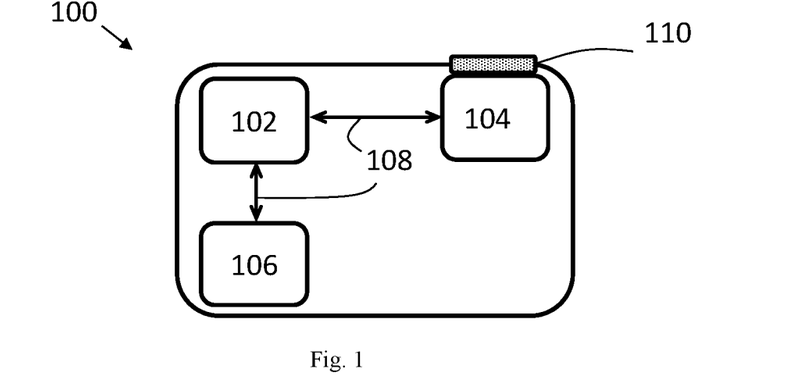
FIG. 1 shows a client device according to an embodiment of the present application.

FIG. 1 shows a client device 100 according to an embodiment of the application. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system.

That the client device 100 is configured to perform certain actions can in this disclosure be understood to mean that the client device 100 comprises suitable means, such as e.g. the processor 102 and the transceiver 104, configured to perform said actions.

According to embodiments of the application the client device 100 is configured to obtain a serving beam configuration when being in a connected state. The serving beam configuration indicates one or more serving beams to be monitored by the client device 100 when being in a power saving state. The client device 100 is further configured to monitor the one or more serving beams of a network access node 300 (shown in FIG. 3) according to the serving beam configuration when being in the power saving state. Upon detecting a beam failure for the one or more monitored serving beams when being in the power saving state, the client device 100 is configured to perform a beam reconfiguration procedure.

Figure 2:
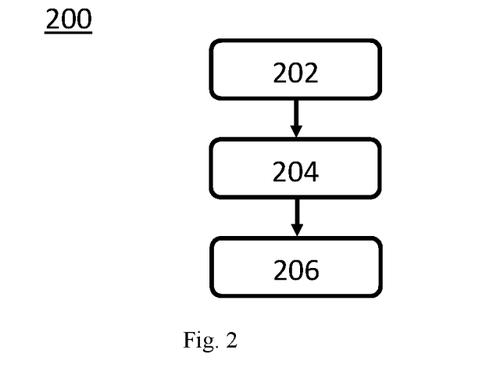
FIG. 2 shows a method for a client device according to an embodiment of the present application.

FIG. 2 shows a flow chart of a corresponding method 200 which may be executed in a client device 100, such as the one shown in FIG. 1. The method 200 comprises obtaining 202 a serving beam configuration when being in a connected state. The serving beam configuration indicates one or more serving beams to be monitored by the client device 100 when being in a power saving state. The method 200 further comprises monitoring 204 the one or more serving beams of a network access node 300 according to the serving beam configuration when being in the power saving state. Furthermore, the method 200 comprises performing 206 a beam reconfiguration procedure upon detecting a beam failure for the one or more monitored serving beams when being in the power saving state.

Figure 3:
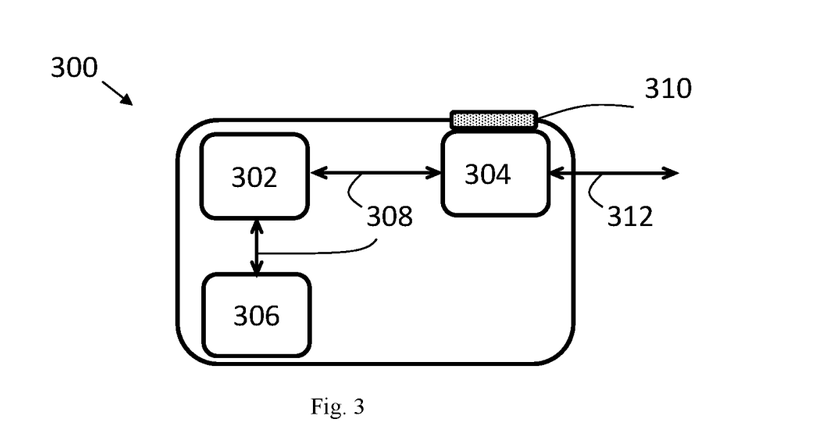
FIG. 3 shows a network access node according to an embodiment of the present application.

FIG. 3 shows a network access node 300 according to an embodiment of the application. In the embodiment shown in FIG. 3, the network access node 300 comprises a processor 302, a transceiver 304 and a memory 306. The processor 302 is coupled to the transceiver 304 and the memory 306 by communication means 308 known in the art. The network access node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304.

That the network access node 300 is configured to perform certain actions can in this disclosure be understood to mean that the network access node 300 comprises suitable means, such as e.g. the processor 302 and the transceiver 304, configured to perform said actions.

According to embodiments of the application the network access node 300 is configured to obtain a serving beam configuration for a client device 100. The serving beam configuration indicates one or more serving beams to be monitored by the client device 100 when the client device 100 is in a power saving state. The network access node 300 is further configured to transmit a reference signal in each one of the one or more serving beams to the client device 100 when the client device 100 is in the power saving state.

Figure 4:
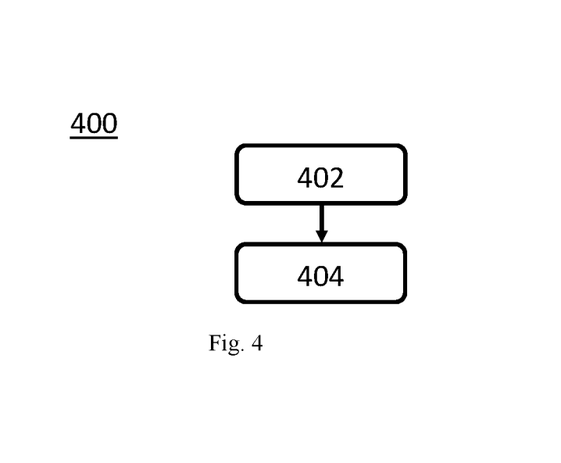
FIG. 4 shows a method for a network access node according to an embodiment of the present application.

FIG. 4 shows a flow chart of a corresponding method 400 which may be executed in a network access node 300, such as the one shown in FIG. 3. The method 400 comprises obtaining 402 a serving beam configuration for a client device 100. The serving beam configuration indicates one or more serving beams to be monitored by the client device 100 when the client device 100 is in a power saving state. The method 400 further comprises transmitting 404 a reference signal in each one of the one or more serving beams to the client device 100 when the client device 100 is in the power saving state.

Figure 5:
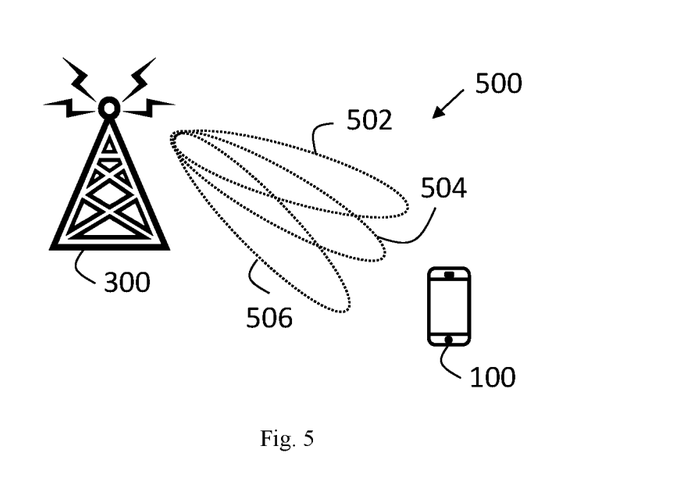
FIG. 5 shows a wireless communication system according to an embodiment of the present application.

FIG. 5 shows a wireless communication system 500 according to an implementation. The wireless communication system 500 comprises a client device 100 and a network access node 300 configured to operate in the wireless communication system 500. For simplicity, the wireless communication system 500 shown in FIG. 5 only comprises one client device 100 and one network access node 300. However, the wireless communication system 500 may comprise any number of client devices 100 and any number of network access nodes 300 without deviating from the scope of the application.

In the wireless communication system 500, the client device 100 can be in a connected state or in a power saving state. In the connected state, the client device has an established connection with a network access node, e.g. the network access node 300 shown in FIG. 5. In the power saving state, the client device does not have a connection with any network access node or its connection have been suspended. In the power saving state the client device 100 may have turned one or more of its transceivers partially of fully off. The power saving state can e.g. be a RRC_INACTIVE state or a RRC_IDLE state.

When the client device 100 is in the connected state, the client device 100 obtains a serving beam configuration indicating one or more serving beams to be monitored by the client device 100 when being in the power saving state. The serving beam configuration for the power saving state may be specific for beam monitoring in the power saving state or may be the same as a serving beam configuration used by the client device 100 when being in the connected state. In the embodiment shown in FIG. 5, the client device 100 is assumed to have obtained a serving beam configuration indicating three serving beams 502, 504, 506 to be monitored by the client device 100 when the client device 100 is in the power saving state. The network access node 300 transmit a reference signal in each one of the three serving beams 502, 504, 506 to the client device 100 and the client device 100 monitors the three serving beams 502, 504, 506 transmitted from a network access node 300 when the client device 100 is in the power saving state. The serving beam configuration may in embodiments be received from the network access node 300, as will now be described with reference to FIG. 6.

Figure 6:
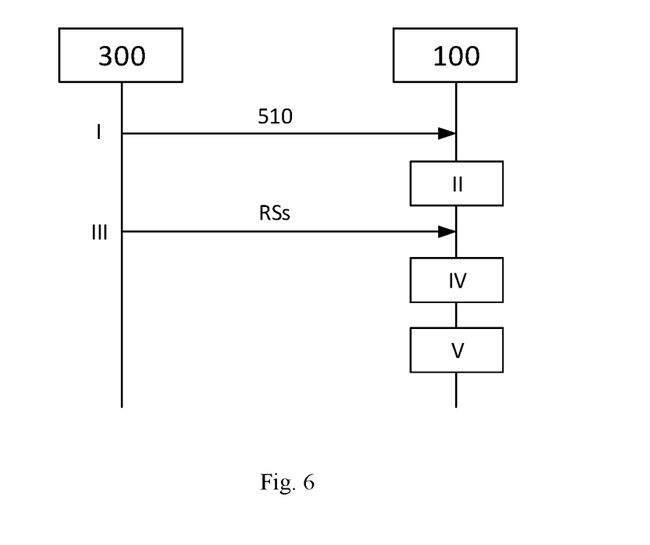
FIG. 6 shows signalling between a network access node and a client device according to an embodiment of the present application.

FIG. 6 shows signalling and interworking between a network access node 300 and a client device 100 according to embodiments of the application. In step I in FIG. 6, the network access node 300 transmits a serving beam configuration 510 to the client device 100 when the client device 100 is in connected state. The serving beam configuration 510 indicates one or more serving beams to be monitored by the client device 100 when the client device 100 is in the power saving state. The network access node 300 may obtain the serving beam configuration for the client device 100 by determining the serving beam configuration or by obtaining the serving beam configuration from e.g. another network node. In embodiments where the network access node 300 determines the serving beam configuration, the network access node 300 may e.g. determine the serving beam configuration based on downlink measurements performed by and received periodically from the client device 100. The serving beam configuration can be signalled in a control channel to the client device 100, e.g. in a PDCCH.

The client device 100 receives the serving beam configuration 510 from the network access node 300. The serving beam configuration 510 is transmitted by the network access node 300 and received by the client device 100, when the client device 100 is in the connected state. In step II in FIG. 6, the state of the client device 100 changes from the connected state to the power saving state. The state change may e.g. be triggered by a state change request from the network access node 300, as known in the art.

When the client device 100 is in the power saving state, the network access node 300 transmits reference signals RSs to the client device 100, as shown in step III in FIG. 6. The network access node 300 transmits one or more reference signals in each one of the one or more serving beams indicated in the serving beam configuration 510. The reference signals RSs may e.g. be SSBs and/or CSI-RSs and may be transmitted periodically. Each reference signal is associated with a specific serving beam according to embodiments of the application.

In step IV in FIG. 6, the client device 100 in the power saving state monitors the one or more serving beams transmitted from a network access node 300 based on the received reference signals RSs from the network access node 300. Upon detecting a beam failure for the one or more monitored serving beams, the client device 100 performs a beam reconfiguration procedure in step V in FIG. 6. The beam reconfiguration procedure may comprise the client device 100 selecting a candidate beam and initiate a random access procedure to restore beam synchronization with the network access node 300, as will now be described with reference to FIG. 7 and FIG. 8.

Figure 7:
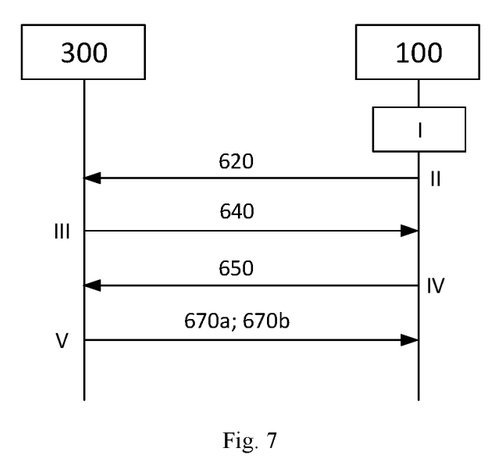
FIG. 7 shows a beam reconfiguration procedure according to an embodiment of the present application.

FIG. 7 shows a beam reconfiguration procedure according to an embodiment of the application. The beam reconfiguration procedure may be performed by a client device 100 in power saving state and may be triggered when a beam failure is detected, as described with reference to FIG. 6. Hence, step I in FIG. 7 is performed when the client device 100 in the power saving state detects a beam failure for the one or more monitored serving beams. In step I in FIG. 7, the client device 100 selects at least one candidate beam. The client device 100 further transmits a random access preamble 620 associated with the selected candidate beam to the network access node 300, as shown in step II in FIG. 7. The selection of candidate beams can be performed in a number of different ways. In a non-limiting example the client device 100 measures all beams from the network and selects one or more of the beams with the highest quality or with a quality above a predefined threshold. The quality mentioned herein can e.g. correspond to a measured SINR value or a received signal strength.

When the network access node 300 receives the random access preamble 620 associated with the candidate beam from the client device 100 the network access node 300 transmits a random access response 640 to the client device 100 in response to the reception of the random access preamble 620, as shown in step III in FIG. 7. Upon reception of the random access response 640 from the network access node 300, the client device 100 transmits a connection resume request 650 to the network access node 300, as shown in step IV in FIG. 7. The connection resume request 650 may e.g. be a RRC connection resume request.

The connection resume request 650 may comprise different information depending on whether the selected candidate beam is within a current radio access network notification area (RNA) of the client device 100 or not. When the selected candidate beam is within the current RNA of the client device 100, the connection resume request 650 may indicate a serving beam configuration update request for the power saving state. On the other hand, when the selected candidate beam is outside the current RNA of the client device 100, the connection resume request 650 may further indicate a RNA update request. Normally, the network access node 300 thereafter transmits a RRC connection release/resume message to the client device 100.

When the network access node 300 receive a connection resume request 650 from the client device 100, where the connection resume request 650 further indicates a serving beam update request for the power saving state, when the candidate beam is within a current RNA of the client device 100, the network access node 300 may update the serving beam configuration for the client device 100. The network access node 300 further transmits the updated serving beam configuration to the client device 100 (not shown in FIG. 7). Hence, in response to the transmission of the connection resume request 650, the client device 100 may receive an updated serving beam configuration from the network access node 300, where the updated serving beam configuration indicates one or more updated serving beams to be monitored by the client device 100 when being in the power saving state. In this case, the client device 100 monitors the one or more updated serving beams according to the updated serving beam configuration when being in the power saving state. Hence, an updating mechanism in respect of the serving beam configuration is provided.

In step V in FIG. 7, the network access node 300 transmits a connection release 670a or a connection resume 670b, in response to the connection resume request 650. For example, when the network access node 300 receive a connection resume request 650 indicating a serving beam update request, the network access node 300 may initiate the update of the serving beam configuration and transmit a connection release 670a to the client device 100, if no other data transmission with the client device 100 is pending. In this case, the client device 100 returns to the power saving state, where the client device 100 monitors the one or more updated serving beams according to the updated serving beam configuration. A connection resume 670b may e.g. be transmitted if further data transmission with the client device 100 is pending.

Figure 8:
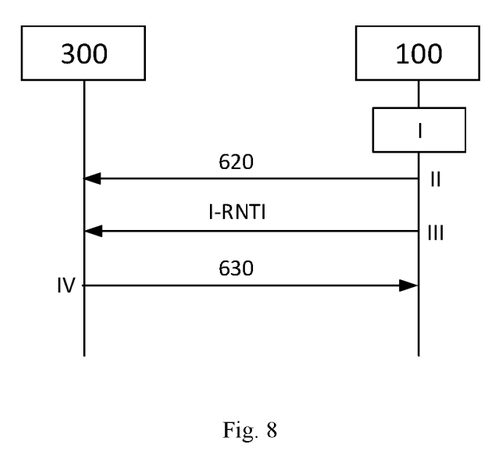
FIG. 8 shows a beam reconfiguration procedure based on an inactive radio network temporary identifier according to an embodiment of the present application.

In embodiments of the application, the client device 100 may use an inactive radio network temporary identifier (I-RNTI) to inform the network access node 300 about the selected candidate beam. In this way, the client device 100 may perform the beam reconfiguration procedure during the power saving state. FIG. 8 shows an embodiment where a beam reconfiguration procedure is performed based on a I-RNTI.

Step I and step II in FIG. 8 corresponds to step I and step II in FIG. 7, respectively. In other words, the client device 100 selects at least one candidate beam in step I in FIG. 8 and transmits a random access preamble 620 associated with the selected candidate beam to the network access node 300 in step II in FIG. 8. The client device 100 further transmits an I-RNTI of the client device 100 to the network access node 300 upon transmitting the random access preamble 620, as shown in step III in FIG. 8. Although shown as a separate step in FIG. 8, the I-RNTI may in embodiments be transmitted together with the random access preamble 620. For example, the client device 100 may transmit one message comprising both the random access preamble 620 and the I-RNTI.

The network access node 300 receives the I-RNTI of the client device 100 from the client device 100 upon reception of the random access preamble 620 from the client device 100 and identifies the client device 100 based on the I-RNTI of the client device 100. Based on the received random access preamble 620 associated with the selected candidate beam, the network access node 300 may update the serving beam configuration for the client device 100. and transmit the updated serving beam configuration to the client device 100 (not shown in FIG. 8). In an alternative the network access node 300 may transmit an acknowledge message to the client device 100 in response to the random access preamble 620.

The network access node 300 transmits a response message 630 to the client device 100, as shown in step IV in FIG. 8, when the client device 100 is in the power saving state. The response message 630 is addressed to the I-RNTI of the client device 100. Hence, the client device 100 receives the response message 630 from the network access node 300 in response to the transmission of the I-RNTI of the client device 100 when the client device 100 is in the power saving state, where the response message 630 is addressed to the I-RNTI of the client device 100. The response message 630 may be used for acknowledging the serving beam update and may in embodiments be a paging message addressed to the I-RNTI of the client device 100.

Furthermore, in embodiments of the application the random access preamble 620 may comprise a preamble sequence which is dedicated to the client device 100 e.g. by the network access node 300. The client device 100 may be informed about the dedicated preamble sequence when being in connected state. In this case the I-RNTI can be excluded, since the client device 100 can be identified based on the dedicated preamble sequence. In further embodiments, a special cause value for the random access may be assigned for the beam reconfiguration procedure, i.e. to initiate a serving beam update procedure. By using dedicated preamble sequences or a special random access cause value for the beam reconfiguration procedure the signalling between the network access node 300 and the client device 100 can be reduced. However, with the beam reconfiguration procedure based on I-RNTI the response message 630 addressed to the client device 100 can be used for acknowledgement, thereby increasing the reliability.

Figure 9:
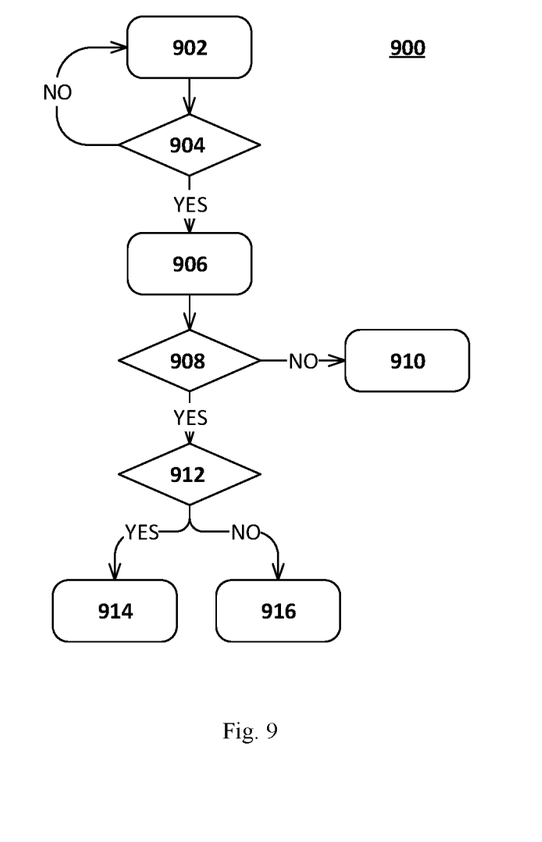
FIG. 9 shows a method for beam management in the power saving state according to an embodiment of the present application.

FIG. 9 shows a method 900 for beam management of a client device 100 in the power saving state. In step 902, the client device 100 monitors one or more serving beams transmitted from a network access node 300 according to a serving beam configuration when being in the power saving state. As previously described, the client device 100 may obtain the serving beam configuration e.g. from the network access node 300. The monitoring in step 902 may comprise the client device 100 determining a quality of each serving beam indicated in the serving beam configuration. The quality of each serving beam may be determined based on measurements of reference signals, such as e.g. SSBs or CSI-RSs, associated with each serving beam.

In step 904, the quality of each serving beam is compared to a quality threshold value, to determine whether the quality of each serving beam is below the quality threshold value or not. When the determined quality of all serving beams are below the quality threshold value, i.e. the outcome of the determination in step 904 is YES, the client device 100 detects a beam failure and moves to step 906. On the other hand, when the determined quality of a serving beam is above the quality threshold value, i.e. the outcome of the determination in step 904 is NO, the client device 100 continues to monitor the one or more serving beams in step 902. Generally, it is not considered a beam failure if the quality of at least one of the serving beams is over the quality threshold value.

Upon detecting the beam failure for the one or more monitored serving beams in step 904, the client device 100 evaluates possible candidate beams in step 906. Step 906 may comprise the client device 100 evaluating the quality of one or more candidate beams to find at least one suitable candidate beam to select from the one or more evaluated candidate beams. In step 908, the client device 100 determines whether a candidate beam was selected or not. If the client device 100 cannot find a suitable candidate beam to select after a certain time, the client device 100 performs step 910, where the client device 100 enters an idle state. Step 910 may e.g. be performed if an inactivity timer expires before a suitable candidate beam has been found. For example, when the power saving state is an inactivity state, the client device 100 may enter an idle state when no candidate beam has been selected upon detecting a beam failure for the one or more monitored serving beams and when an inactivity timer associated with the one or more monitored serving beams has expired. The candidate beam is a beam which is not a beam belonging to the set of serving beams.

If a candidate beam is selected, the client device 100 determines in step 912 whether the selected candidate beam belongs to the same RAN as the one or more serving beams or not. When the selected candidate beam belongs to the same RAN as the one or more serving beams, i.e. the outcome of the determination in step 912 is YES, the client device 100 transmits a connection resume request 650 indicating a serving beam configuration update request for the power saving state in step 914, as described with reference to FIG. 7. Step 914 may alternatively comprise the client device 100 transmitting a random access preamble 620 and a I-RNTI of the client device 100, as described with reference to FIG. 8. On the other hand, when the selected candidate beam belongs to a different RAN than the one or more serving beams, i.e. the outcome of the determination in step 912 is NO, the client device 100 transmits a connection resume request 650 indicating indicates a RNA update request in step 916.

By using the serving beam monitoring in power saving state and beam reconfiguration procedure according to embodiments of the application, the network access node 300 is aware of the serving beams the network access node 300 can use to reach the client device 100, when the client device 100 is in the power saving state. Thereby, the network access node 300 can reach or wake-up the client device 100 rapidly and without wasting radio resources. For example, the network access node 300 may page the client device 100 only in the one or more serving beams, instead of paging the client device 100 within the whole RAN.

According to embodiments of the application, the client device 100 hence monitors for a paging message 610 in the one or more serving beams when being in the power saving state. If the network access node 300 want to reach the client device 100, the network access node 300 may transmit a paging message 610 to the client device 100 in the one or more serving beams, monitored by the client device 100, when the client device 100 is in the power saving state.

In a similar way, wake-up signalling may be performed based on the one or more serving beams monitored by the client device 100 in the power saving state. In embodiments, the client device 100 is configured with a wake-up signalling configuration based on which the client device 100 monitors wake-up signals.

According to embodiments of the application the client device 100 obtains a wake-up signalling configuration when being in the connected state. The wake-up signalling configuration indicates wake-up signals to be monitored by the client device 100 on the one or more serving beams when being in the power saving state. The client device 100 may e.g. receive the wake-up signalling configuration from the network access node 300. In this case, the network access node 300 may determine the wake-up signalling configuration for the client device 100 when the client device 100 is in the power saving state and transmit the wake-up signalling configuration to the client device 100.

When being in the power saving state, the client device 100 monitors wake-up signals 660 in the one or more serving beams according to the wake-up signalling configuration. If the network access node 300 want to wake-up the client device 100, the network access node 300 transmits wake-up signals 660 in the one or more serving beams to the client device 100 when the client device 100 is in the power saving state.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the application may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the application is not limited to the embodiments described above, but also relates to and incorporates all embodiments within the scope of the appended independent claims.

What is claimed is:

1. An apparatus, comprising:
    at least one processor; and
    a memory coupled to the at least one processor, the memory having stored thereon a program configured to be executed by the at least one processor, the program including instructions for:
        obtaining, while the apparatus is in a connected state, a serving beam configuration, the serving beam configuration indicating one or more serving beams to be monitored when the apparatus is in a power saving state, the power saving state being a state in which a wireless communication system relies on an inactive radio network temporary identifier (I-RNTI) of the apparatus to identify the apparatus;
        monitoring, while the apparatus is in the power saving state, the one or more serving beams according to the serving beam configuration;

performing, while the apparatus is in the power saving state, a beam reconfiguration procedure upon detecting a beam failure for the one or more monitored serving beams;
selecting a candidate beam upon detecting the beam failure for the one or more monitored serving beams;
transmitting a random access preamble associated with the selected candidate beam; and
transmitting the I-RNTI of the apparatus upon transmitting the random access preamble.

2. The apparatus according to claim 1, the program further including instructions for monitoring, while the apparatus is in the power saving state, for a paging message in the one or more serving beams.

3. The apparatus according to claim 1, the program further including instructions for:
receiving, while in the power saving state, a response message in response to the transmission of the I-RNTI, the response message being addressed to the I-RNTI.

4. The apparatus according to claim 1, the program further including instructions for:
transmitting a connection resume request upon reception of a random access response, wherein the connection resume request further indicates a serving beam configuration update request for the power saving state when the selected candidate beam is within a current radio access network notification area (RNA).

5. The apparatus according to claim 4, the program further including instructions for:
receiving an updated serving beam configuration in response to the transmission of the connection resume request, wherein the updated serving beam configuration indicates one or more updated serving beams to be monitored when being in a power saving state; and
monitoring the one or more updated serving beams according to the updated serving beam configuration when being in the power saving state.

6. The apparatus according to claim 1, wherein the power saving state is a state in which the client device does not have an established, active connection with any network access node configured to transmit any of the one or more serving beams.

7. The apparatus according to claim 1, wherein the power saving state is an RRC_INACTIVE state or an RRC_IDLE state.

8. The apparatus according to claim 1, wherein the power saving state is a sleep state.

9. An apparatus, comprising:
at least one processor;
a memory coupled to the at least one processor, the memory having stored thereon a program configured to be executed by the at least one processor, the program including instructions for:
obtaining a serving beam configuration indicating one or more serving beams to be monitored when a client device is in a power saving state, the power saving state being a state in which a wireless communication system relies on an inactive radio network temporary identifier (I-RNTI) of the client device to identify the client device;
transmitting a reference signal in each one of the one or more serving beams to the client device when the client device is in the power saving state;
receiving a random access preamble associated with a candidate beam from the client device when the client device is in the power saving state;
transmitting a random access response to the client device in response to the reception of the random access preamble;
receiving the I-RNTI of the client device from the client device upon reception of the random access preamble from the client device;
identifying the client device based on the I-RNTI of the client device; and
transmitting a response message to the client device when the client device is in the power saving state, wherein the response message is addressed to the I-RNTI of the client device.

10. The apparatus according to claim 9, the program further including instructions for:
transmitting a paging message to the client device in the one or more serving beams when the client device is in the power saving state.

11. The apparatus according to claim 9, the program further including instructions for:
receiving a connection resume request from the client device, wherein the connection resume request further indicates a serving beam update request for the power saving state when the candidate beam is within a current radio access network notification area (RNA) of the client device;
updating the serving beam configuration for a client device; and
transmitting the updated serving beam configuration to the client device.

12. A method, comprising:
obtaining a serving beam configuration indicating one or more serving beams to be monitored when a client device is in a power saving state, the power saving state being a state in which a wireless communication system relies on an inactive radio network temporary identifier (I-RNTI) of the client device to identify the client device;
transmitting a reference signal in each one of the one or more serving beams to the client device when the client device is in the power saving state;
receiving a random access preamble associated with a candidate beam from the client device when the client device is in the power saving state; and
transmitting a random access response to the client device in response to the reception of the random access preamble,
wherein transmitting a random access response to the client device comprises:
receiving the I-RNTI of the client device from the client device upon reception of the random access preamble from the client device;
identifying the client device based on the I-RNTI of the client device, and
transmitting a response message to the client device when the client device is in the power saving state, wherein the response message is addressed to the I-RNTI of the client device.

13. The method according to claim 12, further comprising transmitting a paging message to the client device in the one or more serving beams when the client device is in the power saving state.

14. The method according to claim 12, further comprising:
receiving a connection resume request from the client device, wherein the connection resume request further indicates a serving beam update request for the power saving state when the candidate beam is within a current radio access network notification area (RNA) of the client device;
updating the serving beam configuration for the client device; and
transmitting the updated serving beam configuration to the client device.

\* \* \* \* \*